United States Patent
Cernohous et al.

(10) Patent No.: US 7,480,733 B2
(45) Date of Patent: Jan. 20, 2009

(54) ROUTING INCOMING CALL REQUESTS

(75) Inventors: Bob Richard Cernohous, Rochester, MN (US); Christopher Thomas Gloe, Rochester, MN (US); Scott Jon Prunty, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 10/892,461

(22) Filed: Jul. 15, 2004

(65) Prior Publication Data

US 2006/0015644 A1   Jan. 19, 2006

(51) Int. Cl.
  *G06F 15/173*  (2006.01)
  *G06F 15/16*   (2006.01)
(52) U.S. Cl. ............. 709/238; 709/227; 709/245
(58) Field of Classification Search .......... 709/238, 709/203, 239, 227, 245
  See application file for complete search history.

(56) References Cited

U.S. PATENT DOCUMENTS

| | | | |
|---|---|---|---|
| 6,128,657 A * | 10/2000 | Okanoya et al. | 709/224 |
| 6,158,644 A * | 12/2000 | Brofman et al. | 228/56.3 |
| 6,470,389 B1 * | 10/2002 | Chung et al. | 709/227 |
| 7,184,945 B1 * | 2/2007 | Takahashi et al. | 703/22 |
| 2005/0193113 A1 * | 9/2005 | Kokusho et al. | 709/225 |

OTHER PUBLICATIONS

Network Working Group, Request for Comments: 1661, "The Point-to-Point Protocol (PPP)".
Network Working Group, Request for Comments: 2661, Layer Two Tunneling Protocol "L2TP".

* cited by examiner

*Primary Examiner*—William C Vaughn, Jr.
*Assistant Examiner*—Kristie D Shingles
(74) *Attorney, Agent, or Firm*—Owen J. Gamon

(57) ABSTRACT

A method, apparatus, system, and signal-bearing medium that in an embodiment dynamically allocate client requests to target servers based on prepare messages sent by the target servers. The addresses of target servers are added to a queue in response to the prepare messages from the target servers. A network interface is then prepared to receive an incoming call request from a client. After the call request arrives from a client, one of the addresses is selected from the queue. The call request is then sent through a tunnel to the target server associated with the selected address.

6 Claims, 5 Drawing Sheets

148

CONTROL MESSAGE

250

TYPE
  PREPARE FOR INCOMING CALL REQUEST
  START CONTROL CONNECTION REQUEST
  STOP CONTROL CONNECTION
  PREPARE FOR INCOMING CALL REPLY

ROUTING INCOMING CALL REQUESTS

FIELD

An embodiment of the invention generally relates to a computer network. In particular, an embodiment of the invention generally relates to routing incoming call requests to target servers in a network.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs. Years ago, computers were isolated devices that did not communicate with each other. But, today computers are often connected in networks, such as the Internet or World Wide Web, and a user at one computer, often called a client, may wish to access information at multiple other computers, often called target servers, via a network.

Various techniques are currently used for communicating between clients and servers. One such technique is called PPP (Point-to-Point Protocol), which is defined in RFC (Request for Comments) 1661. PPP defines an encapsulation mechanism for transporting multi-protocol packets across layer 2 (L2) point-to-point links. Typically, a user obtains an L2 connection to a Network Access Server (NAS) using one of a number of techniques, such as dialup POTS (Plain Old Telephone Service), ISDN (Integrated Services Digital Network), or ADSL (Asymmetric Digital Subscriber Line). Then, the user runs PPP over that connection. In such a configuration, the L2 termination point and PPP session endpoint reside on the same physical device, i.e., the NAS.

Another technique for communicating between clients and servers is called L2TP (Layer 2 Tunneling Protocol), which is defined in RFC 2661 and is hereby incorporated by reference. L2TP extends the PPP model by allowing the L2 and PPP endpoints to reside on different devices interconnected via a packet-switched network. With L2TP, a user has an L2 connection to an access concentrator (e.g., a modem bank, ADSL, or DSLAM (Digital Subscriber Line Access Module)), and the concentrator then tunnels individual PPP frames to the NAS. This allows the actual processing of PPP packets to be divorced from the termination of the L2 circuit.

A technique for routing client requests to target servers using L2TP is called compulsory tunneling, in which a particular client user id (identification) is routed via a L2TP tunnel after partial identification. For example, an ISP (Internet Service Provider) is connected to a LAN (Local Area Network), which is connected to a particular target server. A variation of compulsory tunneling is called multihop, in which tunnels are chained together after a partial authentication. For example, a client may be connected to the Internet, which is connected to a router, and then the router is connected to a LAN, which is connected to the target server.

The main disadvantage of the compulsory tunneling and multihop techniques is that they require static configuration on the ISP, firewall, or router that connects the client to the target server. They also require partial authentication, which involves the following steps. First, the client and the ISP, firewall, or router exchange negotiations (e.g., PPP LCP (Link Control Protocol) negotiations) up to an authentication stage. Second, the ISP, firewall, or router uses the authentication information with some external configuration information to choose a target server. Third, the ISP, firewall, or router starts the next part of the route. Finally, the negotiation may need to restart from the beginning between the client and the target server. Unfortunately, partial identification increases the chance of retry/timeout failures under heavy load, which degrades network performance.

The compulsory tunneling and multihop techniques described above also present challenges when a target server is down or overloaded and traffic needs to be re-routed to a different target server. Current techniques for attempting to address these challenges, and the limitations of these techniques include the following.

In a first technique, the ISP, firewall, or router is reconfigured to route requests to different servers when a particular target server is down or the network configuration changes. Unfortunately, reconfiguration requires manual intervention by a system administrator, which can causes significant delays while the system administrator diagnoses and addresses the problem.

In a second technique, the ISP, firewall, or router looks up the target server by name via DNS (Domain Name System) and receives a list of addresses pointing to different servers. This technique requires special software on the ISP, firewall, or router to take advantage of this list for load balancing of client requests among the target servers. Alternatively, the ISP, firewall, or router can look up the target server every time it needs to route a new connection and the DNS can round robin the first IP address to load balance among the target services. Unfortunately, this technique generates extra traffic on the network and does not handle the target server being down or otherwise inoperative.

In a third technique, when a target server goes down, a second server takes over the IP (Internet Protocol) address of the target server. Unfortunately, this technique does not help with load balancing of requests among target servers. When requests are not properly load balanced among the target servers, a subset of the target servers receives a disproportionate number of requests to the exclusion of other target servers, which results in the subset being a bottleneck to performance while the other target servers are underutilized and their performance capacity is wasted.

In a fourth technique, called dynamic DNS, the DNS is updated when a server is down due to route traffic to a new target server, which requires additional software and does not help resolve load balancing problems.

Without a better technique for routing incoming client requests to target servers, client requests will continue to suffer from degraded performance and target servers will continue to suffer from poor load balancing.

SUMMARY

A method, apparatus, system, and signal-bearing medium are provided that in an embodiment dynamically allocate client requests to target servers based on prepare messages sent by the target servers. The addresses of target servers are added to a queue in response to the prepare messages from the target servers. A network interface is then prepared to receive an incoming call request from a client. After the call request arrives from a client, one of the addresses is selected from the queue. The call request is then sent through a tunnel to the target server associated with the selected address.

DETAILED DESCRIPTION

Figure 1:
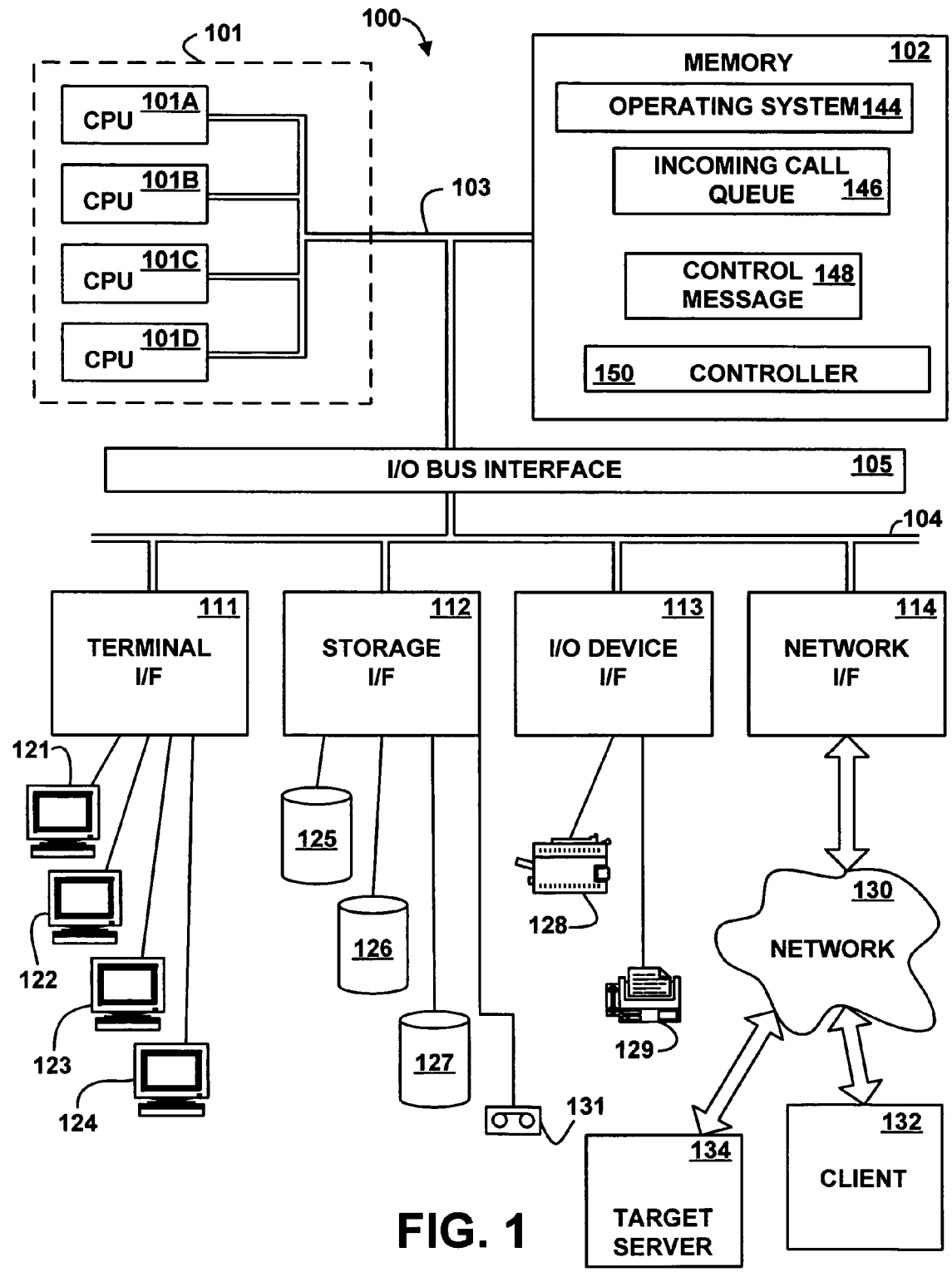
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100 connected to clients 132 and target servers 134 via a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs r sets of CPUs, as is known in any of various so-called non-uniform memory access (NUMA) computer architectures.

The memory 102 includes an operating system 144, an incoming call queue 146, a control message 148, and a controller 150. Although the operating system 144, the incoming call queue 146, the control message 148, and the controller 150 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the operating system 144, the incoming call queue 146, the control message 148, and the controller 150 are all illustrated as being contained within the memory 102 in the computer system 100, these elements are not necessarily all completely contained in the same storage device at the same time.

The operating system 144 may be implemented via OS/400, AIX, or Linux, but in other embodiments any appropriate operating system may be used. The operating system 144 may include low-level code to manage the resources of the computer system 100.

The controller 150 processes the control messages 148 received from the target servers 134 via the network 130 and processes incoming calls received from the clients 132 via the network 130. The controller 150 further manages the incoming call queue 146. The incoming call queue 146 is further described below with reference to FIG. 2A. The control message 148 is further described below with reference to FIG. 2B.

In an embodiment, the controller 150 includes instructions capable of executing on the processor 101 or statements capable of being interpreted by instructions executing on the processor 101 to perform the functions as further described below with reference to FIGS. 3, 4, and 5. In another embodiment, the controller 150 may be implemented in microcode. In yet another embodiment, the controller 150 may be implemented in hardware via logic gates and/or other appropriate hardware techniques, in lieu of or in addition to a processor-based system.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the DASD 125, 126, and 127 may be loaded from and stored to the memory 102 as needed. The storage interface unit 112 may also support other types of devices, such as a tape device 131, an optical device, or any other type of storage device.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types.

The network interface 114 provides one or more communications paths from the computer system 100 to other digital devices and computer systems; such paths may include, e.g., one or more networks 130. In various embodiments, the network interface 114 may be implemented via a modem, a LAN (Local Area Network) card, a virtual LAN card, or any other appropriate network interface or combination of network interfaces.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a firewall, router, Internet Service Provider (ISP), personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present, and the client 132 and the target server 134 need not be connected to the same network. For example, in an embodiment, the clients 132 are connected to the computer system 100 via the Internet while the target server 134 is connected to the computer system 100 via a LAN.

The client 132 may further include some or all of the hardware components previously described above for the computer system 100. Although only one client 132 is illustrated, in other embodiments any number of clients may be present. The client 132, or a user of the client 132, desires to send requests to the target servers 134.

In L2TP terms, the computer system 100 acts as a LAC (L2TP Access Concentrator), which is a node that acts as one side of an L2TP tunnel endpoint and is a peer to the target server 134, which in L2TP terms is an L2TP Network Server (LNS), but in other embodiments any appropriate protocol may be used. The LAC sits between an LNS and a remote system and forwards packets to and from each of them. The target server 134 may include some or all of the hardware elements previously described above for the computer system 100. In an embodiment, the target server 134 may be implemented as an LNS in L2TP terms, but in other embodiments any appropriate protocol may be used.

It should be understood that FIG. 1 is intended to depict the representative major components of the computer system 100, the network 130, the clients 132, and the target servers 134 at a high level, that individual components may have greater complexity than represented in FIG. 1, that components other than, fewer than, or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
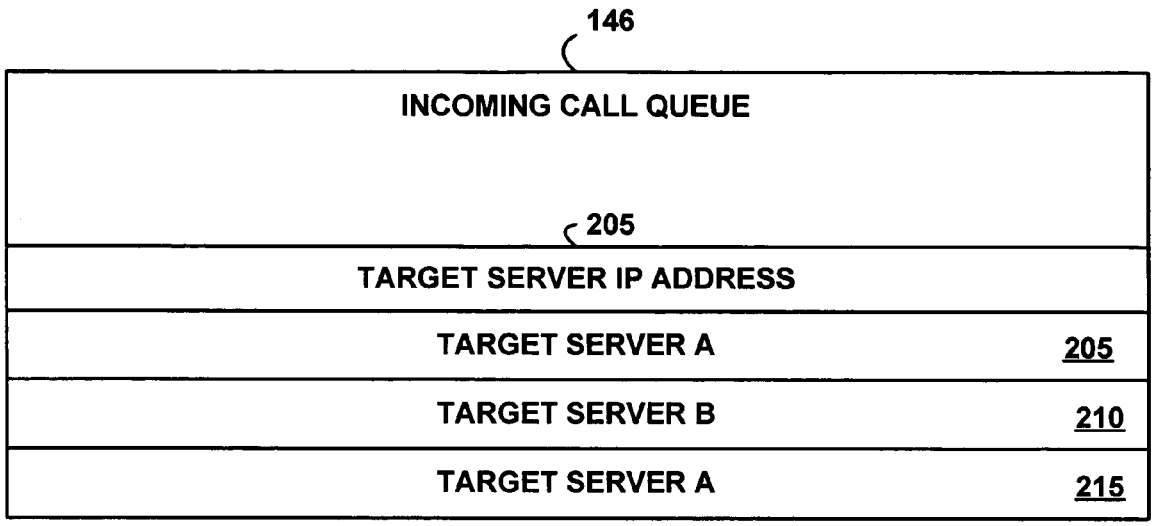
FIG. 2A depicts a block diagram of an example data structure for an incoming call queue, according to an embodiment of the invention.

FIG. 2A depicts a block diagram of an example data structure for the incoming call queue 146, according to an embodiment of the invention. The incoming call queue 146 includes a FIFO (First In First Out) queue of addresses of the target servers 134. For a FIFO queue, addresses of the target servers 134 are added to the queue 146, in order, as control messages are received from the target servers 134 and are removed in the same order that they were received. In another embodiment, the incoming call queue 146 is a round-robin queue of addresses of the target servers 134. For a round-robin queue, each of the target servers 134 has a separate queue (or a count of how many control messages were received) and the queues are serviced alternately, in turn.

Illustrated are entries 205, 210, and 215 in the incoming call queue 146, but in other embodiments any number of entries with any appropriate type of identifications (IP address or other type of address) of the target servers 134 may be present. Each of the target servers 134 may be identified any appropriate number of times in the incoming call queue 146. The controller 150 enqueues or adds the entries to the incoming call queue 146 in response to a control message from the target server 134, as further described below with reference to FIG. 3. The controller 150 dequeues or removes the entries from the incoming call queue 146 in response to an incoming call from the client 132, as further described below with reference to FIGS. 4 and 5.

Figure 2B:
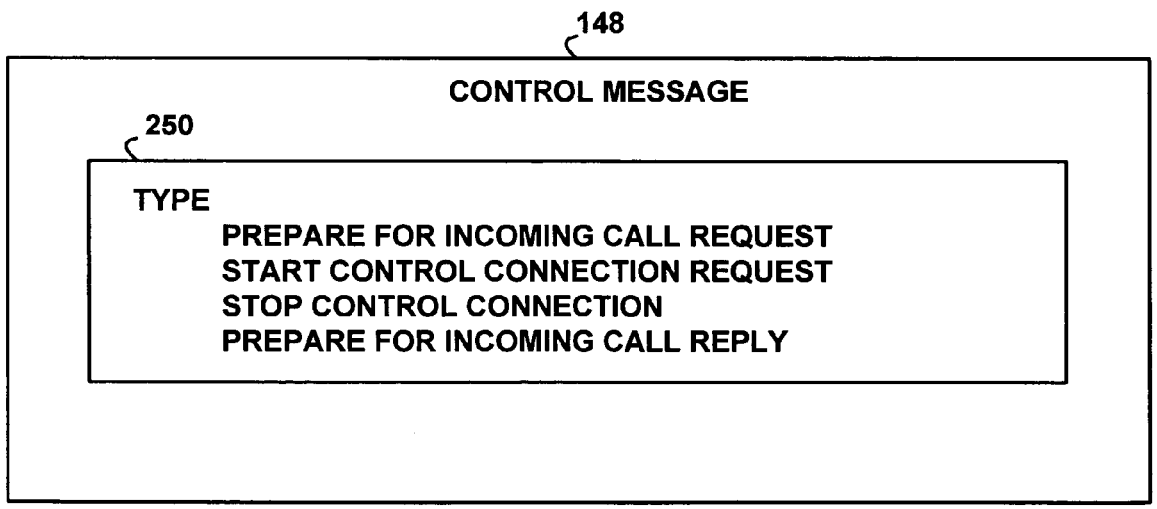
FIG. 2B depicts a block diagram of an example data structure for a control message, according to an embodiment of the invention.

FIG. 2B depicts a block diagram of an example data structure for the control message 148, according to an embodiment of the invention. In L2TP terms, control messages are exchanged between LAC and LNS pairs, operating in-band within a tunnel protocol. Control messages govern aspects of the tunnel and sessions within the tunnel. A tunnel exists between a LAC-LNS pair. The tunnel consists of a control connection and zero or more L2TP sessions. The tunnel carries encapsulated PPP datagrams and control messages between the LAC and LNS. But, in other embodiments, any appropriate protocol and any appropriate type of control message may be used.

The control message 148 includes a type field 250. In an embodiment, the type 250 is a message type AVP (Attribute Value Pair), which is a variable length concatenation of a unique attribute and a value containing the actual value identified by the attribute. Multiple AVPs make up the control messages 148, which are used in the establishment, maintenance, and teardown of tunnels and calls. The type field 250 indicates the type of the control message 148, such as a "prepare for incoming call request" message, a "start control connection request" message, a "stop control connection" message, and a "prepare for incoming call reply" message, but in other embodiments any appropriate types may be used. The processing for the various types of control messages is further described below with reference to FIGS. 3, 4, and 5. In an embodiment, the "prepare for incoming call request" type and the "prepare for incoming call reply" type are optional, and the control messages having the "prepare for incoming call request" type and the "prepare for incoming call reply" type may include a mandatory indicator set to off, so that implementations that do not support this type may ignore these control messages. But, in another embodiment, the "prepare for incoming call request" type and the "prepare for incoming call reply type" may be required to be supported.

Figure 3:
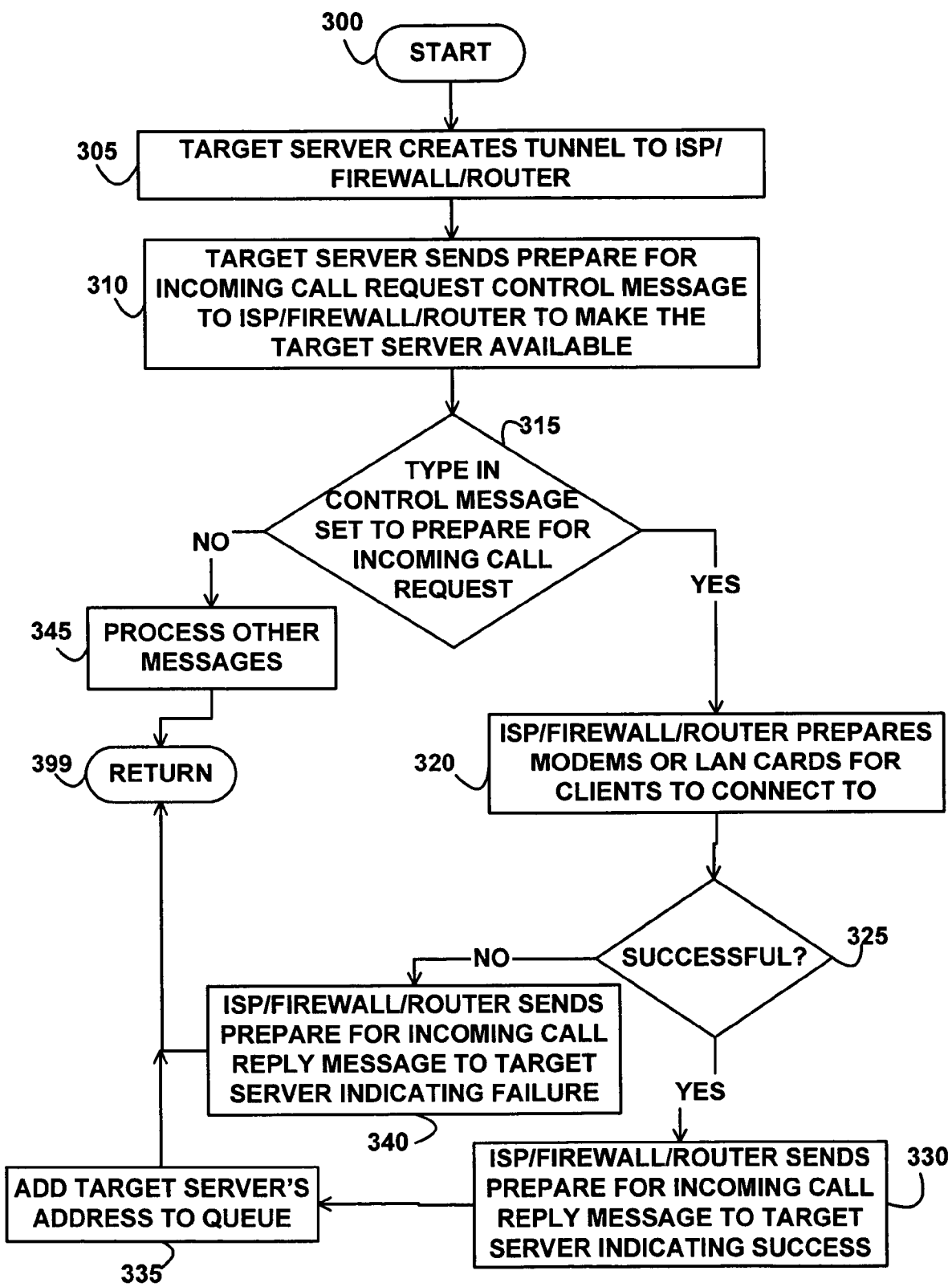
FIG. 3 depicts a flowchart of example processing for handling a prepare for incoming call request control message from a target server, according to an embodiment of the invention.

FIG. 3 depicts a flowchart of example processing for handling a prepare for incoming call request control message, according to an embodiment of the invention. Control begins at block 300. Control then continues to block 305 where the target server 134 creates a tunnel to the computer system 100. Control then continues to block 310 where the target server 134 sends the control message 148 to the computer system 100, which is intended to make the target server 134 available to the clients 132.

Control then continues to block 315 where the controller 150 determines whether the control message 148 contains the type 250 that indicates that this control message is intended to prepare the computer system 100 for an incoming call from one of the clients 132.

If the determination at block 315 is true, then the type 250 in the control message 148 indicates that the computer system 100 should prepare for an incoming call, so control continues from block 315 to block 320 where the controller 150 prepares the network interface 114, such as a modem or LAN card, for the clients 132 to connect to.

Control then continues to block 325 where the controller 150 determines whether the preparation at block 320 was successful. If the determination at block 325 is true, then the preparation of the network interface 114 at block 320 was successful, so control continues from block 325 to block 330 where the controller 150 sends a prepare for incoming call reply message in response to the control message 148 to the target server 134 indicating success. Control then continues to block 335 where the controller 150 adds the address of the target server 134 to the incoming call queue 146, e.g., as entry 205, 210, or 215 as previously described above with reference to FIG. 2A. Control then continues to block 399 where the logic of FIG. 3 returns.

If the determination at block 325 is false, then the preparation of the network interface 114 was not successful, so control continues from block 325 to block 340 where the controller 150 sends a prepare for incoming call reply message in response to the control message to the target server 134 indicating failure. Control then continues to block 399 where the logic of FIG. 3 returns.

If the determination at block 315 is false, then the type 250 is not prepare for an incoming call, so control continues from block 315 to block 345 where the controller 150 processes other messages. Control then continues to block 399 where the logic of FIG. 3 returns.

Figure 4:
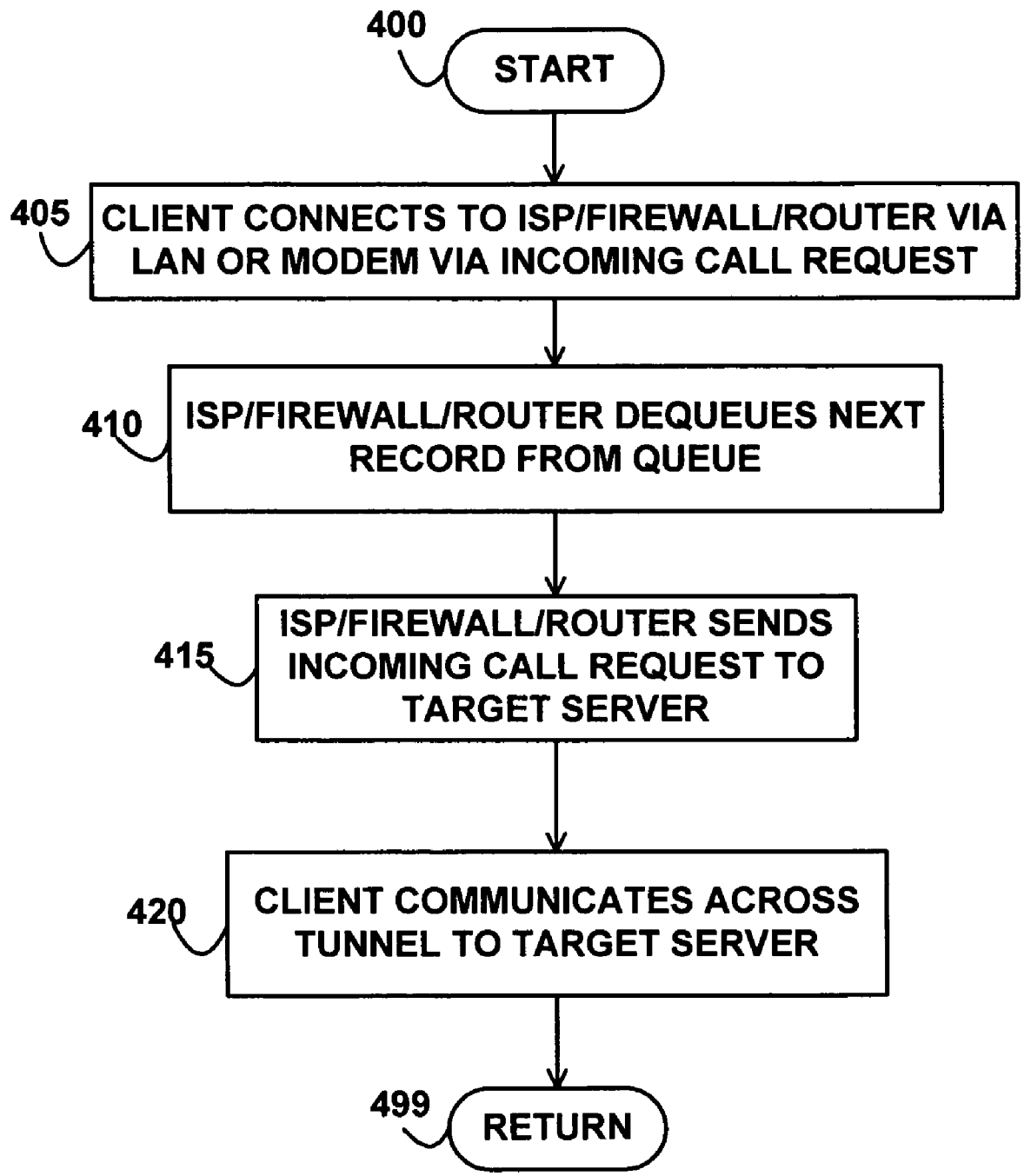
FIG. 4 depicts a flowchart of example processing for handling an incoming call request from a client, according to an embodiment of the invention.

FIG. 4 depicts a flowchart of example processing for handling an incoming call request from one of the clients 132, according to an embodiment of the invention. Control begins at block 400. Control then continues to block 405 where the client 132 connects to the controller 150 via the network interface 144 via an incoming call request.

In an embodiment, a call is a connection or attempted connection between a remote system and LAC. A call, incoming or outgoing, which is successfully established between a remote system and LAC results in a corresponding L2TP session within a previously established tunnel between the LAC and LNS. An incoming call is received at the LAC to be tunneled to the LNS. An outgoing call is a call placed by the LAC on behalf of the LNS. A remote system is an end-system or router attached to a remote access network (i.e., a Public Switched Telephone Network), which is either the initiator or recipient of a call. In another embodiment, a call may be any technique for the clients 132 to connect to the computer system 100 via the network interface 114.

Control then continues to block 410 where the controller 150 dequeues the next entry from the incoming call queue 146. Control then continues to block 415 where the controller 150 sends the incoming call request to the target server 134 whose address was dequeued from the incoming call queue 146. Control then continues to block 420 where the client 132 that initiated the incoming call request communicates across the tunnel to the target server 134 whose address was dequeued from the incoming call queue 146. Control then continues to block 499 where the logic of FIG. 4 returns.

Figure 5:
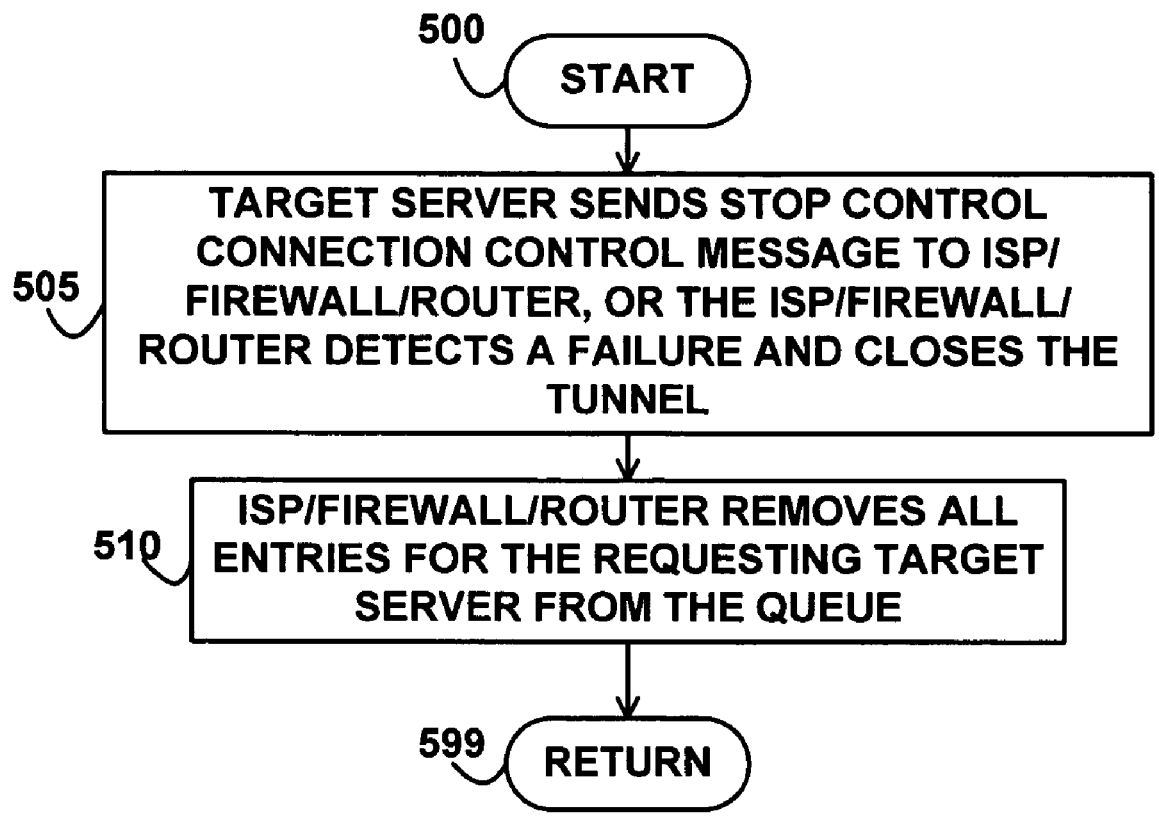
FIG. 5 depicts a flowchart of example processing for handling a stop control connection control message from a target server, according to an embodiment of the invention.

FIG. 5 depicts a flowchart of example processing for handling a stop control connection control message, according to an embodiment of the invention. Control begins at block 500. Control then continues to block 505 where the target server 134 sends a stop control connection control message to the controller 150 in the computer system 100, or the controller 150 detects a failure and closes the tunnel. Control then continues to block 510 where the controller 150 removes all entries for the requesting target server 134 from the incoming call queue 146. Control then continues to block 599 where the logic of FIG. 5 returns.

In this way, a static configuration of the target servers 134 to the clients 132 is not required. Instead, the target servers 134 are made available for incoming calls dynamically as requested by the target servers 134. Thus, for example, if one of the target servers 134 goes down, it is removed from the queue and its requests may be handled by other target servers 134 as soon as the failure is detected. Also, when the request load from the clients 132 is heavy or at scheduled times, new target servers 134 may be brought online. A target server 134 may also reduced its load dynamically if desired by sending fewer, or none at all, of the prepare control messages to the computer system 100 or by sending a stop control connection control message. Further, because partial authentication is not required, retry/timeout failures are less likely.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    receiving prepare messages at a computer system from target servers, wherein the prepare messages indicate that the computer system is to prepare the computer system for incoming calls from clients;
    adding addresses of the target servers to a queue at the computer system in response to the receiving the prepare messages from the target servers;
    preparing a network interface for the incoming call requests and sending replies to the target server in response to the prepare messages;
    receiving a first incoming call request at the computer system from a first client via the network interface;
    selecting one of the addresses in the queue and removing the one of the addresses from the queue, in response to the receiving the first incoming call request from the first client;
    sending the first incoming call request to one of the target servers associated with the one of the addresses, wherein the first incoming call request creates a tunnel from the first client to the one of the target servers and the first client communicates across the tunnel to the one of the target servers, wherein the tunnel comprises a control connection and a session; and
    removing all of the addresses associated with the one of the target servers from the queue in response to a close request from the one of the target servers.

2. The method of claim 1, wherein the queue comprises a round-robin queue.

3. The method of claim 1, wherein the queue comprises a FIFO queue.

4. A method for configuring a computer comprising:
    configuring the computer to receive prepare messages from target servers, wherein the prepare messages indicate that the computer is to prepare the computer for incoming calls from clients;
    configuring the computer to add addresses of the target servers to a queue at the computer in response to the receiving the prepare messages from the target servers;
    configuring the computer to prepare a network interface for the incoming call requests and send replies to the target server in response to the prepare messages;
    configuring the computer to receive a first incoming call request at the computer from a first client via the network interface;
    configuring the computer to select one of the addresses in the queue and remove the one of the addresses from the queue, in response to the receive the first incoming call request from the first client;
    configuring the computer to send the first incoming call request to one of the target servers associated with the one of the addresses, wherein the first incoming call request creates a tunnel from the first client to the one of the target servers and the first client communicates across the tunnel to the one of the target servers, wherein the tunnel comprises a control connection and a session; and
    configuring the computer to remove all of the addresses associated with the one of the target servers from the queue in response to a close request from the one of the target servers.

5. The method of claim 4, wherein the queue comprises a round-robin queue.

6. The method of claim 4, wherein the queue comprises a FIFO queue.

* * * * *